United States Patent
Shahar et al.

(10) Patent No.: US 10,852,967 B2
(45) Date of Patent: Dec. 1, 2020

(54) FACILITATING VIRTUAL FUNCTIONS USING MEMORY ALLOCATION IN A VIRTUALIZATION ENVIRONMENT

(71) Applicant: MELLANOX TECHNOLOGIES, LTD., Yokneam (IL)

(72) Inventors: Ariel Shahar, Jerusalem (IL); Peter Paneah, Nesher (IL); Maxim Zaborov, Beer-Sheva (IL)

(73) Assignee: Mellanox Technologies, Ltd., Yokneam (IL)

( * ) Notice: Subject to any disclaimer, the term of this patent is extended or adjusted under 35 U.S.C. 154(b) by 253 days.

(21) Appl. No.: 15/963,236

(22) Filed: Apr. 26, 2018

(65) Prior Publication Data

US 2019/0332291 A1 Oct. 31, 2019

(51) Int. Cl.
*G06F 3/06* (2006.01)
*G06F 13/16* (2006.01)

(52) U.S. Cl.
CPC .......... *G06F 3/0631* (2013.01); *G06F 3/0604* (2013.01); *G06F 3/0664* (2013.01); *G06F 3/0673* (2013.01); *G06F 13/1668* (2013.01); *G06F 2213/0026* (2013.01)

(58) Field of Classification Search
None
See application file for complete search history.

(56) References Cited

U.S. PATENT DOCUMENTS

| 2010/0306416 | A1* | 12/2010 | Watkins | G06F 9/5011 710/5 |
| 2011/0219164 | A1* | 9/2011 | Suzuki | G06F 13/12 710/316 |
| 2012/0166690 | A1* | 6/2012 | Regula | G06F 13/404 710/104 |
| 2017/0286149 | A1* | 10/2017 | Lu | G06F 13/4282 |

\* cited by examiner

*Primary Examiner* — Denise Tran
(74) *Attorney, Agent, or Firm* — Alston & Bird LLP

(57) ABSTRACT

Apparatuses and methods are described that provide for a mechanism for allocating physical device memory for one or more virtual functions. In particular, a memory allocating framework is provided to utilize device memory more efficiently by mapping at least one target location of the physical memory in a Base Address Register (BAR) associated with the virtual function from a plurality of available target locations based on an allocation request. The memory allocating framework is further configured to compare an indication associated with the requesting virtual function to an identifier of the requested target location. Moreover, the memory allocating framework is further configured to allow the simultaneous use of more than one virtual function at a time while providing isolation between multiple virtual functions.

20 Claims, 5 Drawing Sheets

FACILITATING VIRTUAL FUNCTIONS USING MEMORY ALLOCATION IN A VIRTUALIZATION ENVIRONMENT

BACKGROUND

The present disclosure relates in general to allocating physical device memory for a plurality of virtual functions while providing isolation between the plurality of virtual functions. In particular, apparatuses and methods for allocating a customized size of memory of a Peripheral Component Interconnect Express (PCIe) device to a virtual function are described.

Virtual functions in a Single Root I/O Virtualization (SRIOV) environment may be used for various purposes. The PCIe device may expose real memory to the PCIe virtual functions. The PCIe device may divide its memory for multiple virtual functions in a linear fashion. The memory, however, has a defined amount of space available for virtual functions. Each virtual function may be associated with a predefined size of memory despite the fact that some of the virtual functions require little or no memory.

As the demands for virtual functions increase, however, it becomes increasingly important to assign and utilize device memory in a more efficient manner.

BRIEF SUMMARY

Embodiments of the invention described herein therefore provide improved apparatuses and methods for allocating physical device memory to one or more virtual functions. In particular, embodiments of the invention provide a mechanism for a memory allocating framework to utilize device memory more efficiently by mapping available target locations of physical memory to particular virtual functions. Moreover, the memory allocating framework is further configured to allow the simultaneous use of more than one virtual function while providing isolation between multiple virtual functions. Embodiments of the invention thus provide a mechanism for dynamically partitioning the memory for virtual functions.

Accordingly, in some embodiments, an apparatus for allocating physical memory of a device to a virtual function is provided that includes a memory allocating framework configured to receive an allocation request for allocating a physical memory of a device to a virtual function. The memory allocating framework is configured to allocate at least one target location of the physical memory in a Base Address Register (BAR) associated with the virtual function from a plurality of available target locations based on the allocation request, wherein the available target locations are available for use by a plurality of different virtual functions. The memory allocating framework is further configured to provide an indication of the at least one allocated target location for use by the virtual function, wherein the allocated target location is accessible by the virtual function exclusively.

In some cases, each target location of the physical memory may comprise an identifier that includes a virtual function descriptor corresponding to a virtual function to which the respective allocated target location is mapped and an offset indicative of the respective target location. In some cases, the memory allocating framework is configured to receive an access request from a requesting virtual function including the indication associated with the requesting virtual function, wherein the requesting virtual function is attempting to access a requested target location, wherein the indication comprises a descriptor of the requesting virtual function and an offset indicative of the requested target location. In some cases, the memory allocating framework is further configured to compare the indication associated with the requesting virtual function to the identifier of the requested target location. In an instance in which the descriptor and the offset of the indication matches the descriptor and the offset of the identifier, the memory allocating framework is further configured to grant the requesting virtual function access to the requested target location.

In some cases, the memory allocating framework is configured to allow execution of an operation by the requesting virtual function using the requested target location, in an instance in which the descriptor and the offset of the indication matches the descriptor and the offset of the identifier. In other cases, the memory allocating framework is configured to deny the requesting virtual function access to the requested target location, in an instance in which the descriptor and the offset of the indication does not match the descriptor and the offset of the identifier. In some cases, the virtual function may comprise a Peripheral Component Interconnect Express (PCIe) function operated in a Single Root I/O Virtualization (SRIOV) environment of a PCIe device. The allocation request may include one or more MEMIC requests associated with the virtual function.

In other embodiments, a method of allocating physical memory of a device to a virtual function is provided. The method comprises receiving an allocation request for allocating a physical memory of a device to a virtual function. The method further comprises allocating at least one target location of the physical memory in a Base Address Register (BAR) associated with the virtual function from a plurality of available target locations based on the allocation request, wherein the available target locations are available for use by a plurality of different virtual functions. In some cases, the method further comprises providing an indication of the at least one allocated target location for use by the virtual function, wherein the allocated target location is accessible by the virtual function exclusively.

In some cases, each target location of the physical memory may comprise an identifier that includes a virtual function descriptor corresponding to a virtual function to which the respective allocated target location is mapped and an offset indicative of the respective target location.

In some cases, the method further comprises receiving an access request from a requesting virtual function including the indication associated with the requesting virtual function, wherein the requesting virtual function is attempting to access a requested target location. The indication may comprise a descriptor of the requesting virtual function and an offset indicative of the requested target location. In some cases, the method further comprises comparing the indication associated with the requesting virtual function to the identifier of the requested target location. In an instance, in which the descriptor and the offset of the indication matches the descriptor and the offset of the identifier, the method further comprises granting the requesting virtual function access to the requested target location.

In some cases, the method may comprise allowing execution of an operation by the requesting virtual function using the requested target location in an instance in which the descriptor and the offset of the indication matches the descriptor and the offset of the identifier. In other cases, the method further comprises denying the requesting virtual function access to the requested target location in an instance in which the descriptor and the offset of the indication does not match the descriptor and the offset of the identifier. The virtual function may comprise a Peripheral Component Interconnect Express (PCIe) function operated in a Single Root I/O Virtualization (SRIOV) environment of a PCIe device.

In other embodiments, an apparatus for allocating physical memory of a device to a virtual function is provided. The apparatus may comprise at least one controller and at least one memory including a computer program code, wherein the at least one memory including the computer program code is configured, with the at least one controller, to cause the apparatus to receive an allocation request for allocating a physical memory of a device to a virtual function. The computer program code are configured, with the at least one controller, to further cause the apparatus to allocate at least one target location of the physical memory in a Base Address Register (BAR) associated with the virtual function from a plurality of available target locations based on the allocation request, wherein the available target locations are available for use by a plurality of different virtual functions. The computer program code are configured, with the at least one controller, to further cause the apparatus to provide an indication of the at least one allocated target location for use by the virtual function, wherein the allocated target location is accessible by the virtual function exclusively.

In some cases, each target location of the physical memory may comprise an identifier that includes a virtual function descriptor corresponding to a virtual function to which the respective allocated target location is mapped and an offset indicative of the respective target location.

In some cases, the computer program code are configured, with the at least one controller, to further cause the apparatus to receive an access request from a requesting virtual function including the indication associated with the requesting virtual function, wherein the requesting virtual function is attempting to access a requested target location, wherein the indication comprises a descriptor of the requesting virtual function and an offset indicative of the requested target location. In some cases, the computer program code are configured, with the at least one controller, to further cause the apparatus to compare the indication associated with the requesting virtual function to the identifier of the requested target location. In some cases, the computer program code are configured, with the at least one controller, to further cause the apparatus to grant the requesting virtual function access to the requested target location, in an instance, in which the descriptor and the offset of the indication matches the descriptor and the offset of the identifier.

In some cases, the computer program code are configured, with the at least one controller, to further cause the apparatus to allow execution of an operation by the requesting virtual function using the requested target location, in an instance in which the descriptor and the offset of the indication does not match the descriptor and the offset of the identifier. In other cases, the computer program code are configured, with the at least one controller, to further cause the apparatus to deny the requesting virtual function access to the requested target location, in an instance in which the descriptor and the offset of the indication does not match the descriptor and the offset of the identifier. In some cases, the virtual function may comprise a Peripheral Component Interconnect Express (PCIe) function operated in a Single Root I/O Virtualization (SRIOV) environment of a PCIe device.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

Figure 1:
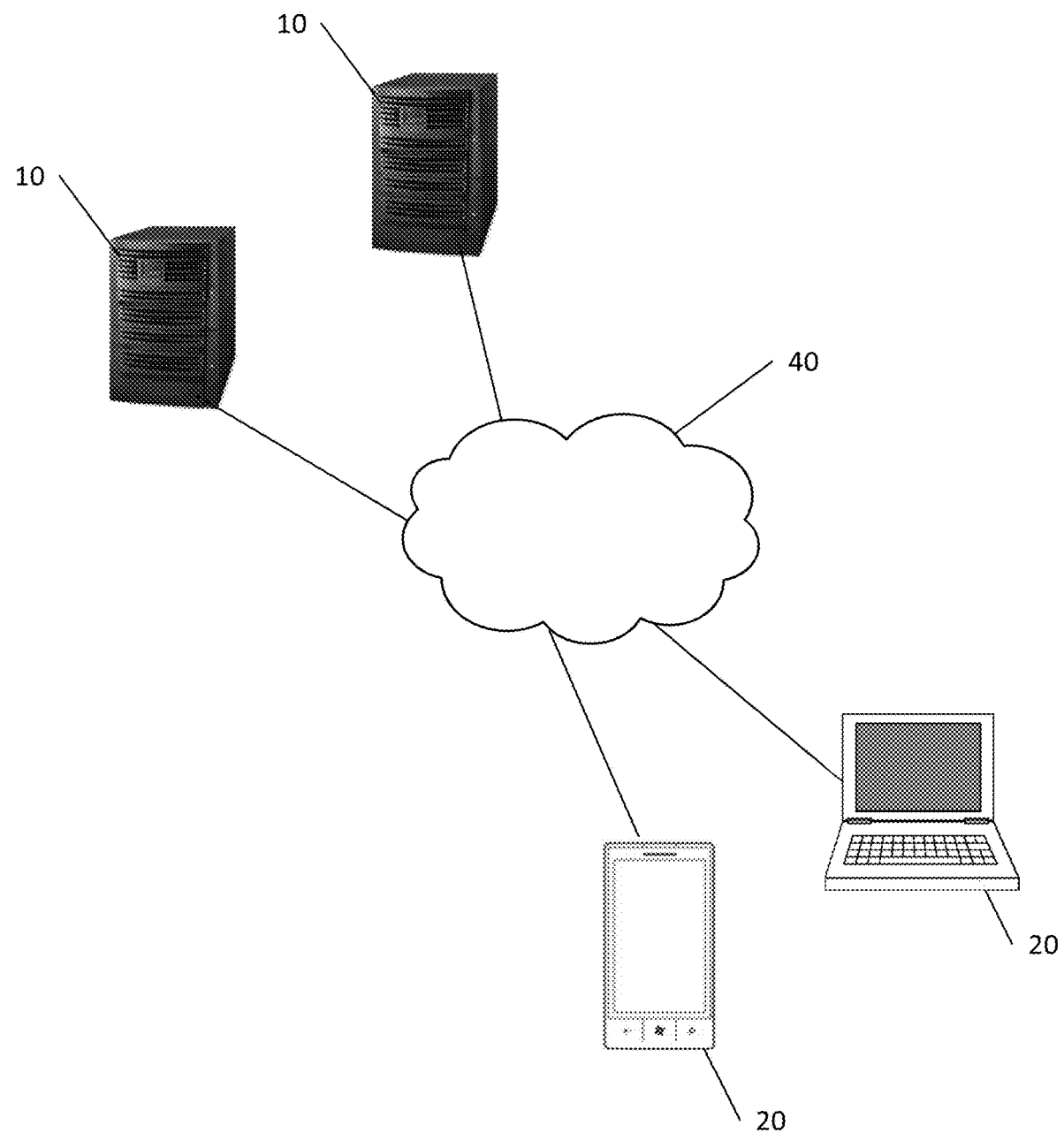
FIG. 1 is an overview of a system that can be used to practice embodiments of the present disclosure, in accordance with example embodiments described herein.

The present invention now will be described more fully hereinafter with reference to the accompanying drawings in which some but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to indicate examples with no indication of quality level. Like numbers refer to like elements throughout.

The use of virtual functions in a Single Root I/O Virtualization (SRIOV) environment may require allocation of a certain amount of device memory for the virtual function. In an SRIOV environment, the entire amount of device memory space is typically divided evenly between virtual functions, even though the virtual function requires on a portion of the total physical memory. Example embodiments of the present invention allow an SRIOV environment to be utilized more efficiently by enabling an associated device to divide the device memory into smaller regions and allow particular virtual functions to use those smaller physical regions exclusively. In this way, a device may allow the simultaneous use of its physical memory by more than one virtual function. Accordingly, example embodiments allocate physical memory to a virtual function by dynamically assigning or mapping to a particular virtual function at least one target location from a plurality of available target locations of the physical memory in the Base Address Registers (BAR) associated with the virtual function. Example embodiments then grant access to the allocated target location by comparing an indication of an incoming request from the requesting virtual function to an identifier of the respective target location that has been pre-mapped, as described in greater detail herein.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media includes all computer-readable media (including volatile and non-volatile media).

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations for allocating memory to the virtual functions and granting access to the requested target location so as to allow execution of various operations of the requesting virtual function. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

Figure 2:
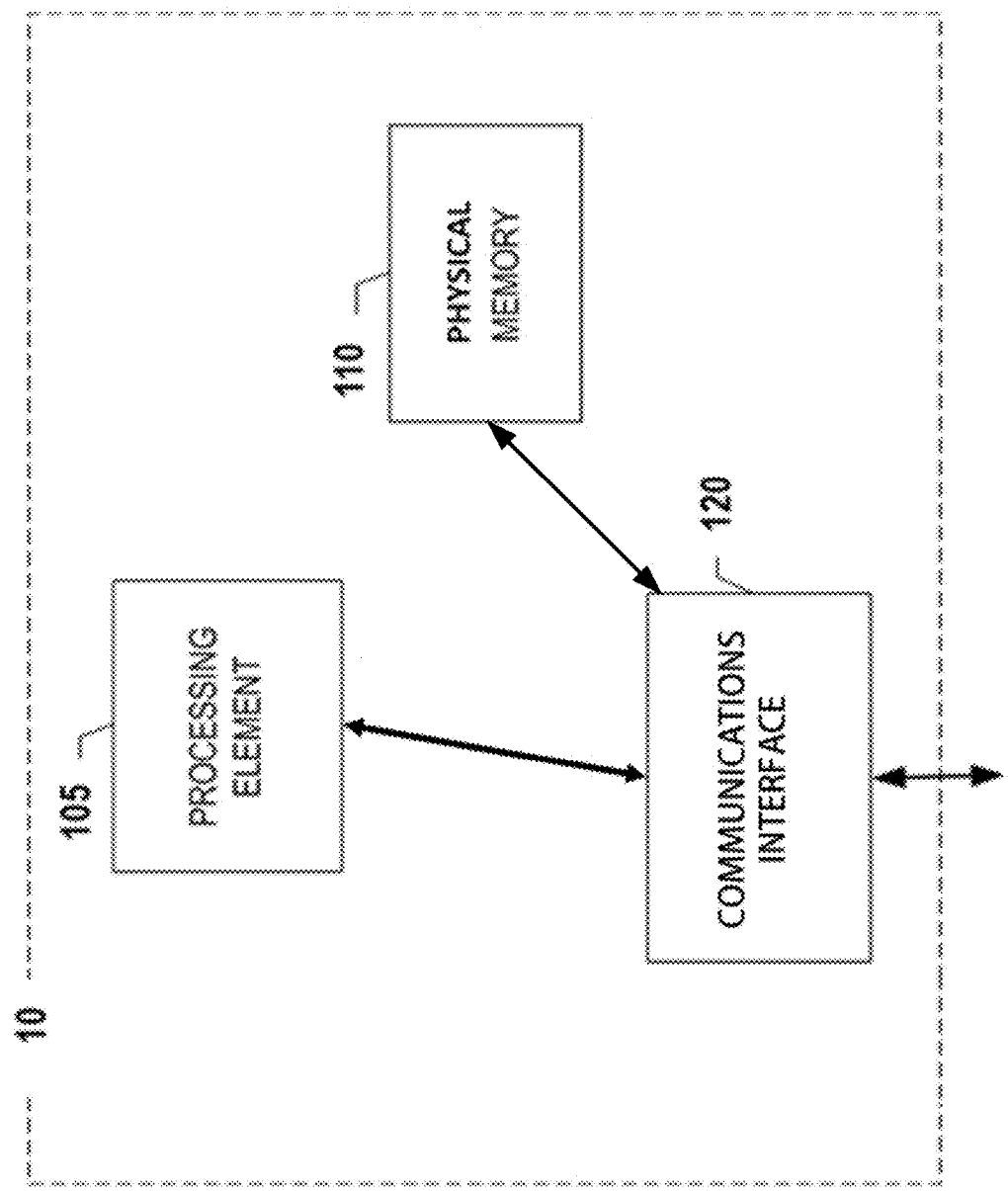
FIG. 2 illustrates an exemplary schematic diagram of a computing entity in accordance with example embodiments described herein.

FIG. 1 provides an illustration of an exemplary embodiment of the present invention. As shown in FIG. 1, this particular embodiment may include one or more allocating entities 10, one or more access request entities 20, one or more networks 30, and/or the like. In some embodiments, the access request entities may communicate requests for a virtual function to have access to physical memory, such as physical memory 110 associated with the allocation entities 10 (FIG. 2). Upon receipt of a request for physical memory, the allocation entity 10 may designate a target location of the physical memory to the requesting virtual function, such that only that particular function is allowed access to the allocated target location. Moreover, the allocating entity may receive access requests from a virtual function to execute an operation using a particular target location of the physical memory. The allocation entity 10 may thus also be configured to compare the address from the requesting virtual function to a pre-stored tag to determine with exclusive use by that requesting virtual function to that particular target location has been pre-assigned and is allowed, or whether such a request must be denied, as described in more detail below.

Each of these components, entities, devices, or systems may be in direct or indirect communication with one another over the same or different wired or wireless networks (such as the network 30 of FIG. 1). Additionally, while FIG. 1 illustrates the various system entities as separate, standalone entities, the various embodiments are not limited to this particular architecture. For instance, not all embodiments will require a separate allocating computing entity 10, and not all embodiments will require a connection to a network 30.

1. Exemplary Allocating Entity

FIG. 2 provides a schematic illustration of an allocating entity 10 according to one embodiment of the present disclosure. In example embodiments, the allocating entity 10 may be configured to utilize a memory allocating framework (e.g., a Multiple Entities' Memory Internally Controlled (MEMIC) framework or the like) for allocating physical memory of a device to a virtual function. In other example embodiments, the allocating entity 10 may be configured to receive a request from a virtual function, such as a virtual function associated with the access requesting entity 20 of FIG. 1, and to map a target location within the physical memory to the virtual function, such that only the mapped virtual function may have access to the corresponding target location of the physical memory 110. The allocating entity 10 may further be configured to determine whether a virtual function requesting access to a particular target location has the right to access the allocated target location of the physical memory of the device, as described in greater detail below.

In some examples, the allocating entity 10 may comprise or otherwise be in communication with the network 30. In one embodiment, the allocating entity 10 is a Peripheral Component Interconnect Express (PCIe) device with virtual functions operated in an SRIOV environment. The allocating entity 10 may be a server configured to communicate with the network 30. The allocating entity 10 may also comprise any of the components described herein with respect to FIG. 1.

In general, the terms computing entity, computer, entity, device, system, and/or the like may refer to, for example, one or more computers, computing entities, desktops, mobile phones, tablets, phablets, notebooks, laptops, distributed systems, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, and/or the like. In one embodiment, these functions, operations, and/or processes can be performed on data, content, information, and/or the like.

In one embodiment, the allocating entity 10 may also include one or more communications interfaces 120 for communicating with various other computing entities, such as by communicating data, content, information, and/or the like that can be transmitted, received, operated on, processed, displayed, stored, and/or the like.

As shown in FIG. 2, in one embodiment, the allocating entity 10 may include or be in communication with one or more processing elements 105 (also referred to as processors, processing circuitry, and/or the like) that communicate with other elements within the allocating entity 10 via a bus, for example. As will be understood, the processing element 105 may be embodied in a number of different ways. For example, the processing element 105 may be embodied as one or more complex programmable logic devices (CPLDs), microprocessors, multi-core processors, co-processing entities, application-specific instruction-set processors (ASIPs), microcontrollers, and/or controllers. Further, the processing element 105 may be embodied as one or more other processing devices or circuitry. The term circuitry may refer to an entirely hardware embodiment or a combination of hardware and computer program products. Thus, the processing element 105 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 105 may be configured for a particular use or configured to execute instructions stored in volatile or non-volatile storage media or otherwise accessible to the processing element 105. As such, whether configured by hardware or computer program products, or by a combination thereof, the processing element 105 may be capable of performing steps or operations according to embodiments of the present disclosure when configured accordingly.

As noted above, the allocating entity 10 may further include or be in communication with a physical memory 110 (also referred to as memory storage, memory circuitry and/or the like). In some cases, the allocating entity 10 may be configured such that the physical memory 110 is separate from the processing element 105, and the physical memory 110 is accessible via the communications interface 120 of the allocating entity 10. In one embodiment, the physical memory 110 may include one or more non-volatile storage media, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The physical memory 110 may also include one or more volatile storage or memory media, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the physical memory 110 may store databases, database instances, database management systems, data, applications, programs, program modules, scripts, source code, object code, byte code, compiled code, interpreted code, machine code, executable instructions, and/or the like.

As indicated, in one embodiment, the allocating entity 10 may also include one or more communications interfaces 120 for communicating with various other computing entities, such as by communicating data, content, information, requests and responses to received requests, etc. that can be transmitted, received, operated on, processed, displayed, stored, and/or the like. Such communication may be executed using a wired data transmission protocol. Similarly, the allocating entity 10 may be configured to communicate via wireless external communication networks using any of a variety of protocols.

As will be appreciated, one or more of the components of the allocating entity 10 may be located remotely from other components of the allocating entity 10, such as in a distributed system. Furthermore, one or more of these components may be combined with additional components to perform various functions described herein, and these additional components may also be included in the allocating entity 10. Thus, the allocating entity 10 can be adapted to accommodate a variety of needs and circumstances. As will be recognized, these architectures and descriptions are provided for exemplary purposes only and are not limiting to the various embodiments.

2. Exemplary Access Request Entity

With reference to FIG. 1, in various embodiments, an access request entity 20 may be configured to exchange and/or store information/data with the allocating entity 10 and the network 30. For instance, the access request entity 20 may be used by a user or by the system to provide information for directing one or more allocation requests for allocating the physical memory from the virtual function to the allocating entity 10 in order to obtain exclusive access rights to and/or access a target location of the physical memory for a virtual function. The access request entity 20 may be used, for example, to receive an indication from the allocating entity 10 that maps a target location of the physical memory 110 to the virtual function. Similarly, the access request entity 20 may be used to request access to a particular target location using the received identifier.

The access request entity 20 may additionally or alternatively receive information/data from the allocating entity 10 or the network 30. Each access request entity 20 may include one or more components that are functionally similar to those of the allocating entity 10 described above with reference to FIG. 2. For example, in one embodiment, each access request entity 20 may include one or more processing elements (e.g., CPLDs, microprocessors, multi-core processors, co-processing entities, ASIPs, microcontrollers, and/or controllers), volatile and non-volatile storage or memory, one or more communications interfaces, and/or one or more user interfaces, as needed.

4. Exemplary Network

In various embodiments, the network 30 may be configured to receive, store, and/or provide information/data comprising mapped physical or virtual memory addresses, available target locations, identifiers, descriptors, requests, and/or other information/data that may be requested by any of a variety of system components, such as by and between the allocating entity 10 and the access request entity or components thereof 20.

In one embodiment, the network 30 may include one or more components that are functionally similar to those of the allocating entity 10 or the access request entity 20, as shown in FIG. 2. For example, in one embodiment, the network 30 may include one or more processing elements (e.g., CPLDs, microprocessors, multi-core processors, co-processing entities, ASIPs, microcontrollers, and/or controllers), volatile and non-volatile storage or memory, one or more communications interfaces, and/or one or more user interfaces.

III. Exemplary System Operation

Figure 3:
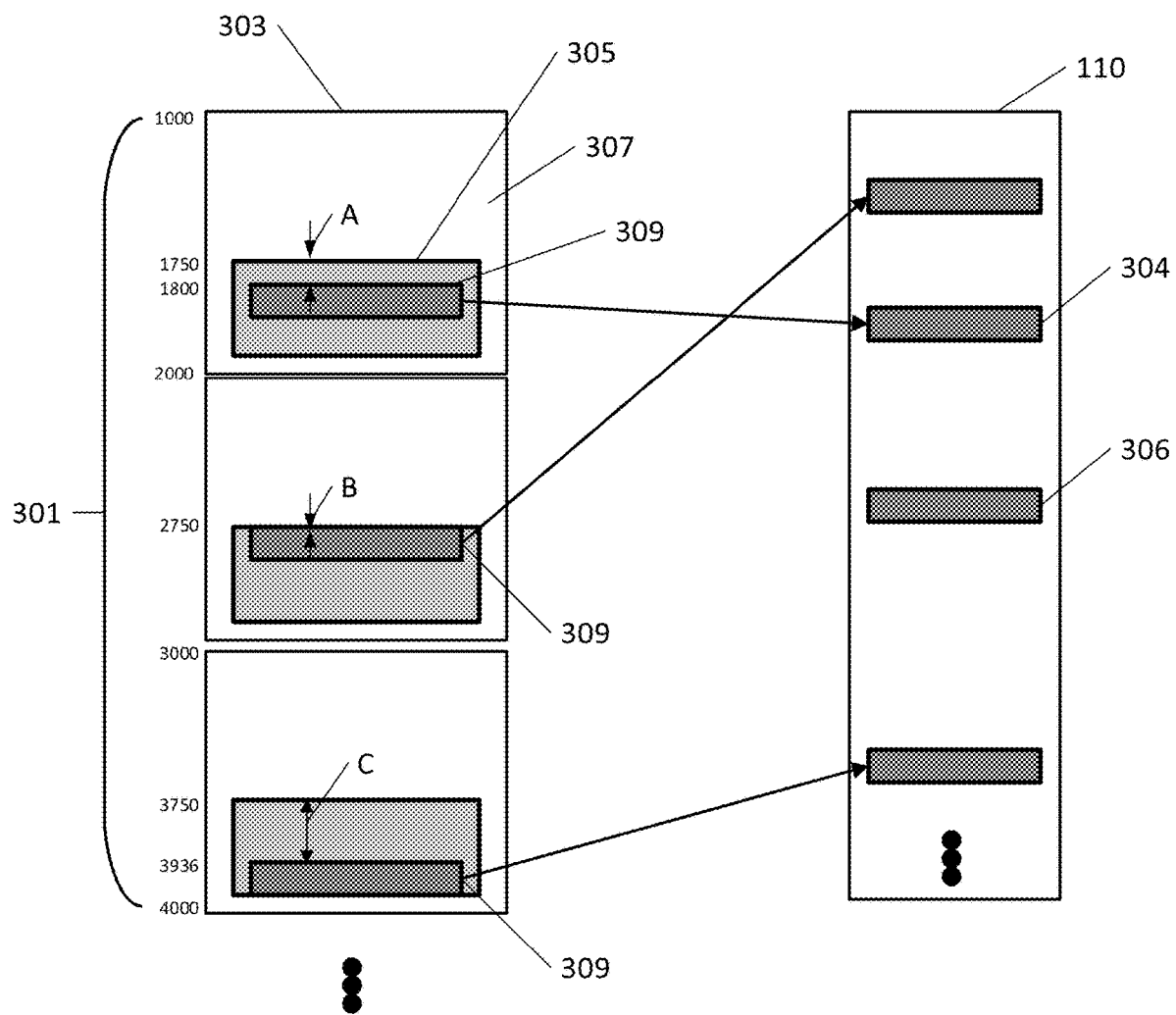
FIG. 3 is a schematic illustration of allocated target locations associated with a physical memory associated with one or more virtual functions according to an example embodiment of the present invention.

FIG. 3 provides a schematic illustration of one or more allocated target locations of a physical memory associated with one or more virtual functions. In some embodiments, a virtualization environment, such as an SRIOV utilizing PCIe functions, enables a device to expose a plurality of PCIe functions which are virtual functions (e.g., VF 0, VF1, etc., as depicted).

A memory allocating framework such as a Multiple Entities' Memory Internally Controlled (MEMIC) framework may be used for allocating physical memory (e.g., the physical memory 110 of the allocating entity 10 of FIG. 2) to one or more virtual functions. In particular, a memory allocating framework is provided that utilizes device memory more efficiently than conventional solutions by allocating to a virtual function at least one target location from a plurality of available target locations of the physical memory in a Base Address Register (BAR) associated with the virtual function based on an allocation request. The memory allocating framework is further configured to compare an indication associated with a requesting virtual function to an identifier of a requested target location to determine if the requesting virtual function is allocated to or otherwise pre-associated with the requested target location, as described below. In this way, the memory allocating framework is configured to allow the simultaneous use of physical memory by more than one virtual function at a time while providing isolation between multiple virtual functions.

With continued reference to FIG. 3, in some embodiments, the MEMIC framework introduces an aperture per virtual function, while joining all virtual functions' apertures to be contiguous, thus avoiding the need to have a silicon BAR for each of the plurality of virtual functions as defined by the SRIOV. The per-virtual function apertures are partitions that reside on a single BAR, referred to herein and depicted in FIG. 3 as a multi-BAR 301. In FIG. 3, each virtual function associated with a multi-BAR 301 is noted on the respective multi-BAR as (VF 0, VF1, etc.). The number of virtual functions having apertures on the BAR is dependent on the total size of the multi-BAR 301. Each aperture of the multi-BAR 301 is referred to here as a mini-BAR 303. In one embodiment, the mini-BAR 303 is also referred to as a MEMIC area. In some embodiments, the physical memory of the device is partitioned into multiple mini-BARs or MEMIC areas. A MEMIC area is composed of one or more MEMIC lines. The MEMIC line is the smallest granularity that can be allocated corresponding to one virtual function. For example, if a MEMIC line has a size of 64 bytes, it implies that each virtual function can be allocated physical memory with a size that is a multiple of 64 bytes.

In some embodiments, each mini-BAR 303 includes one or more target locations 309. The target locations 309 are identically-sized apertures within the mini-BAR 303. Each virtual function may be allocated to one or more target locations 309 from each of the mini-BARs 303, thus optimizing the use of the total size of physical memory required on the PCIe device. In one embodiment, this is achieved by having a registering configuration inside the PCIe device that defines an offset from the base of the mini-BAR 303 where the MEMIC begins for all of the virtual functions. In some cases, for example, the offset is an integer indicating the distance or displacement between the beginning or base address of the mini-BAR 303 and a given MEMIC-able region 305 or between the beginning of the MEMIC-able region 305 and a given target location 309. Thus, an offset describes not only the MEMIC-able region 305 within a mini-BAR 303 but also an allocated target location 309 within the MEMIC-able region 305. In one embodiment, the MEMIC-able region 305 represents potential allocating regions. When a requesting PCIe access request attempts to access a respective configuration, the requesting access is attributed as a MEMIC access. In some cases, the offset is used for mapping the address information from the requesting PCIe access request to an allocated candidate for accessing the physical memory 110. In one embodiment, the allocation request may include one or more MEMIC line requests associated with the virtual function. In some embodiments, the PCIe device may include multiple MEMIC frameworks corresponding to one or more virtual functions.

In some embodiments, each mini-BAR 303 or MEMIC line has an identifier on the PCIe device hardware that denotes the virtual function to which a target location 309 of the mini-BAR has been assigned. For example, the identifier may comprise a virtual function descriptor corresponding to (e.g., identifying) a virtual function to which the respective target location is allocated and an offset indicative of the respective target location (e.g., describing which target location 309 is allocated to the identified virtual function, such as by describing its position within the mini-BAR). For example, in FIG. 3, a target location 309 with an address of 1800 resides in the MEMIC-able region 305 with addresses from 1750 to 2000. In one embodiment, the address is an arbitrary unit with 1000 units representing each mini-BAR 303. In some cases, the minimum size of the MEMIC-able region 305 is one fourth of the total size of the mini-BAR 303, and the starting addresses of the MEMIC-able region 305 are the same for each mini-BAR 303. For example, there may be multiple MEMIC-able regions 305 with starting addresses of 1750, 2750, 3750, etc. respectively, as shown in FIG. 3. The target locations 309 within the MEMIC-able regions 305 can have different configurations for different mini-BARs 303. In one embodiment, the offset is indicative of an available area within the respective target location 309. For a target location 309 with a starting address of 1800 residing within a MEMIC-able region 305, the offset A is 50 as measured from the beginning of the MEMIC-able region 305. In another example, for a second target location 309 with a starting address of 2750 residing within a second MEMIC-able region 305, the offset B is 0 as measured from the beginning of the second MEMIC-able region 305. In yet another example, for a third target location 309 with a starting address of 3936 residing within a third MEMIC-able region 305, the offset C is 186 as measured from the beginning of the third MEMIC-able region 305. In some cases, the minimum size of the target location 309 is 64 kilobytes.

In one embodiment, dynamically mapping or assigning at least one target location 309 of the physical memory 110 in the BAR comprises continuously assigning available target addresses on the respective target location of the physical memory. For example, the target location 309 is mapped to a physical location 304 of the physical memory 110. In one embodiment, the physical location of 304 includes the actual address of 1800 as a tag in an address descriptor of the physical memory 110. In one embodiment, the physical memory 110 includes one or more invalid locations 306 in unmapped regions of the physical memory 110. In another embodiment, dynamically mapping or assigning at least one target location of the physical memory in the BAR comprises discontinuously assigning available target addresses on the respective target location of the physical memory.

Accordingly, as the allocating entity 10 (FIG. 1) receives an allocation request via the access request entity 20 (FIG. 2), the allocating entity 10 will map a target location 309 to the virtual function associated with the allocation request and will provide an indication to the respective virtual function of the at least one allocated target location. In addition, the allocating entity 10 will assign a corresponding identifier to the allocated target location 309 signifying the association between the mapped physical location 304 and the requesting virtual function. For example, allocated target location 309 of the mini-BAR 303 can be mapped to the physical location of 304 of the physical memory 110. In the depicted example, an identifier with the virtual function number of 1 and an offset of 50 is associated with the allocated target location 309 and mapped physical location 304.

In some embodiments, the one or more mapped physical locations 304 are randomly assigned. Additionally or alternatively, the mini-BAR 303 may comprise the MEMIC-able region 305, and a MEMIC-unable region 307. In one embodiment, MEMIC-able region 305 corresponds to the region where actual memory exists (e.g., memory that can be used by the mapped virtual functions to carry out the respective virtual functions), whereas the MEMIC-unable region 307 does not have memory associated with physical locations 304 that is accessible to the virtual functions. In some embodiments, the available target locations are available for use by a plurality of different virtual functions (e.g., prior to being mapped to a particular virtual function).

In some embodiments, the one or more allocated target locations 309 and one or more physical locations 304 are pre-mapped, such that at least some of the target locations are associated with respective virtual functions as a result of a mapping carried out by the allocating entity based on the allocation request. In such embodiments, each allocated target location 309 may only be accessed by the virtual function to which it was mapped. A virtual function requesting access to a target location 309 to which that virtual function was not mapped would therefore be denied access, as described in greater detail below.

The allocating entity 10 (FIG. 1) may receive an access request from a virtual function attempting to access a particular target location 309 within the mini-BAR 303. The access request may thus include the indication of the allocated target location 309. In this regard, the indication may include a descriptor of the requesting virtual function (e.g., identifying which virtual function is requesting access) and an offset indicative of the requested target location 309). The allocating entity 10 in such embodiments may thus compare the indication of the access request with the identifier of the requested target location to ensure that the requested target location is allocated to the requesting virtual function, such that access to that target location can be allowed. Thus, in an instance in which the descriptor and the offset of the indication matches the descriptor and the offset of the identifier, the requesting virtual function may be granted access to the requested target location 309 to enable that virtual function to carry out its operations (e.g., allowing execution of an operation by the requesting virtual function using the requested target location). In an instance in which the descriptor and the offset of the indication do not match the descriptor and the offset of the identifier, the allocating entity may be configured to deny the requesting virtual function access to the requested target location.

Figure 4:
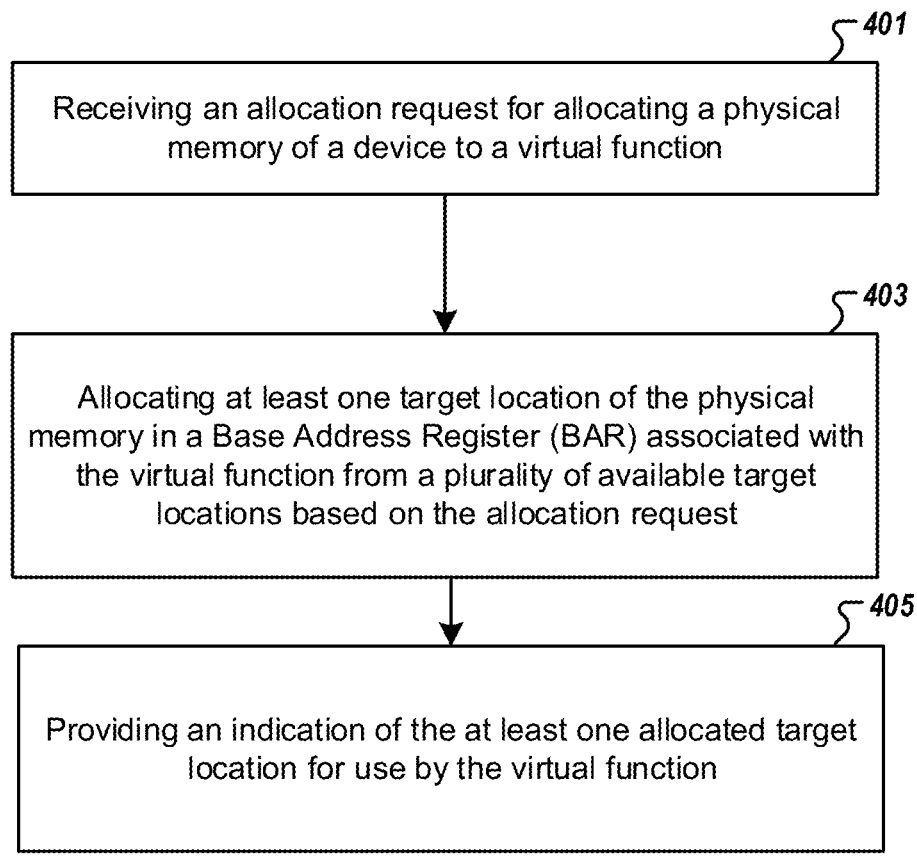
FIG. 4 is a flow chart illustrating a method for allocating physical memory of a device to a virtual function according to an example embodiment of the present invention.

FIG. 4 provides a flowchart illustrating a set of operations that may be performed in an example embodiment for allocating physical memory of a device to a virtual function. According to embodiments of the method, as shown in block 401, the allocating entity 10 may include means, such as a communications interface 120, a physical memory 110, or the like, for receiving an allocation request (e.g., via an access request entity 20) for allocating a physical memory of a device to a virtual function. In this regard, the allocating entity 10 may itself directly communicate the indication following allocating of the virtual function to an available target area or may otherwise extract information from the request to perform the allocating. However, in other embodiments, the request may be received via the network 30 that is connected to the allocating entity 10, and the indication or other response may thereafter be transmitted to the requesting virtual function via the network 30, or the allocating entity may use the network to carry out the mapping or grant of access, such as by communicating with other computing entities on the network.

At block 403, the allocating entity 10 may include means, such as the processing element 105 or the like, for mapping at least one target location from a plurality of available target locations of the physical memory in a BAR associated with the virtual function based on the allocation request. In one embodiment, one or more mapping indications or information may be retrieved from the physical memory 110 of the allocating entity 10 (i.e., where it had been stored or allocated sometime in the past for later analysis), so mapping of the target locations comprises a transfer of the plurality of target locations from one of the memories.

As shown in block 405, the allocating entity 10 may include means, such as the processing element 105 or the like, for providing an indication of the at least one allocated target location 309 for use by the virtual function. In one embodiment, the allocated target location 309 is accessible by the virtual function exclusively. In this regard, for example, if 1 kilobyte of a requested target location of a mini-BAR 303 (e.g., totaling 64 kilobytes) of the physical memory (e.g., the physical memory totaling 4 megabytes) is used by a requesting virtual function, the rest of the mini-BAR cannot be used by other virtual functions. In some embodiments, one mini-BAR 303 is assigned to one virtual function exclusively. However, in other embodiments, multiple mini-BARs 303 are assigned to the same virtual function.

Figure 5:
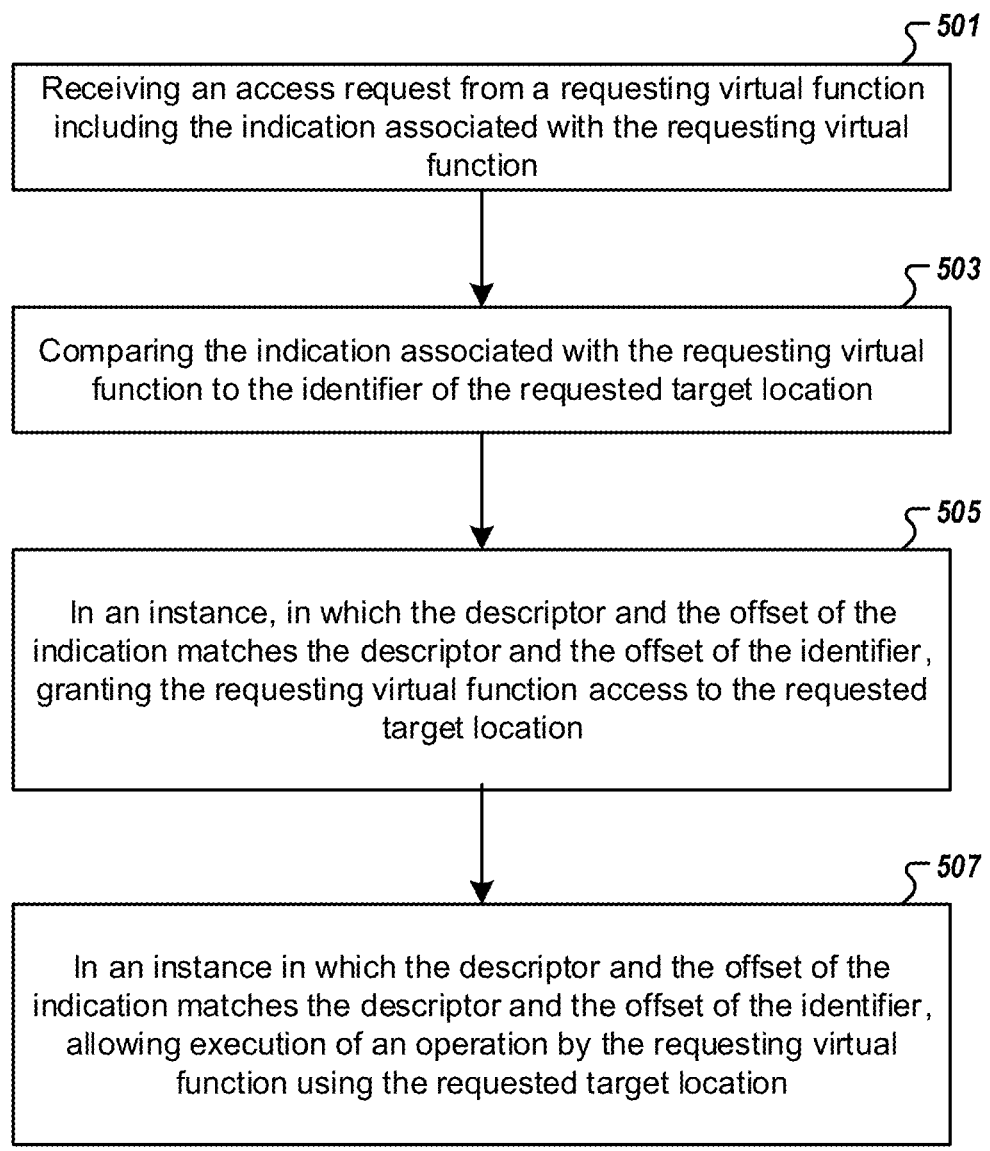
FIG. 5 is a flow chart illustrating a method for allowing a virtual function access to a physical memory of a device according to an example embodiment of the present invention.

FIG. 5 provides another flowchart illustrating a set of operations that may be performed by the allocating entity 10 in another example embodiment to map the physical memory. As shown in block 501, the allocating entity 10 includes means, such as processing element 105 or the like, for receiving an access request from a requesting virtual function including the indication associated with the requesting virtual function, wherein the requesting virtual function is attempting to access a requested target location. In one embodiment, the indication comprises a descriptor of the requesting virtual function and an offset indicative of the requested target location. As shown in block 503, the allocating entity 10 includes means, such as processing element 105 or the like, for comparing the indication associated with the requesting virtual function to the identifier of the requested target location.

As shown in block 505, the allocating entity 10 includes means, such as processing element 105 or the like, for granting the requesting virtual function access to the requested target location, in an instance in which the descriptor and the offset of the indication matches the descriptor and the offset of the identifier. In some embodiments, as shown in block 507, the allocating entity 10 includes means, such as processing element 105 or the like, for allowing execution of an operation by the requesting virtual function using the requested target location, in an instance in which the descriptor and the offset of the indication matches the descriptor and the offset of the identifier. In some embodiments, the identifiers are being compared upon receipt of one or more READ or WRITE operations from the PCIe device. In an instance in which the descriptor of the requested target location and the offset of the indication matches the descriptor and the offset of the identifier of the requested target location respectively, then the responding MEMIC line is allowed to be accessed. For a READ operation, data in the MEMIC line associated with the identifier will be returned, and for WRITE operation, data in the MEMIC line will be modified according to one or more WRITE values.

In other embodiments, in an instance in which the descriptor and the offset of the indication does not match the descriptor and the offset of the identifier, the allocating entity 10 may deny the requesting virtual function access to the requested target location. In one embodiment, in case there is no identifier that associated with a certain incoming access request, or no identifier matches both the descriptor and the offset of the indication in the access request, the incoming access request is considered a non-allocated address. In this regard, for a READ operation, default data (e.g., 0x0, 0xDeadBeef, 0xBadAcce5, etc.) may be returned, whereas for a WRITE operation the information to be written to the requested target location will be dropped and the operation will be ignored. In one embodiment, default data of 0xBADACCE5 may be returned to one or more phantom addresses. In some embodiments, the allocation of physical memory per virtual function is robust, such that each one of the plurality of virtual functions gets a separate and isolated requested target location (e.g., a MEMIC line as a associative lookup), while preserving the PCIe expectation that any READ or WRITE access is allowed, even though there is no underlying actual memory.

Example embodiments of the present invention have been described above with reference to block diagrams and flowchart illustrations of methods and apparatuses. In some embodiments, certain ones of the operations above may be modified or further amplified as described below. Furthermore, in some embodiments, additional optional operations may be included. Modifications, additions, or amplifications to the operations above may be performed in any order and in any combination.

In an example embodiment, an apparatus for performing the methods of FIG. 4 and FIG. 5 above may comprise an allocating entity 10 and/or a network 30 (FIG. 1) configured to perform some or each of the operations described above. The allocating entity 10 may, for example, be configured to perform the operations by performing hardware implemented logical functions, executing stored instructions, or executing algorithms for performing each of the operations.

It will be understood that each operation, action, step and/or other types of functions shown in the diagram (FIG. 3), and/or combinations of functions in the diagram and/or described herein, can be implemented by various means. For example, the apparatus may comprise means for performing each of the operations described above. In this regard, according to an example embodiment, examples of means for performing operations may comprise, for example, the processing element 105 and/or a device or dedicated circuitry for performing the operations as described above.

Many modifications and other embodiments of the inventions set forth herein will come to mind to one skilled in the art to which these inventions pertain having the benefit of the teachings presented in the foregoing descriptions and the associated drawings. Although the figures only show simplified representations of an allocating entity, an access request entity, and other system components and configurations as described herein, it is understood that the particular configurations, components, and representations are for the purposes of explanation, and embodiments of the invention may be implemented with respect to various other types of network architectures and protocols. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for allocating physical memory of a device to a virtual function, the apparatus comprising:
   a physical memory; and
   a processing device configured to:
      receive an allocation request for allocating the physical memory to a virtual function;
      allocate at least one target location of the physical memory in a Base Address Register (BAR) associated with the virtual function based on the allocation request, wherein an identifier for the at least one target location comprises an offset associated with the at least one target location and a corresponding physical location of the physical memory; and
      provide an indication of the at least one allocated target location for use by the virtual function, wherein the allocated target location is accessible by the virtual function exclusively.

2. The apparatus of claim 1, wherein the identifier comprises a virtual function descriptor corresponding to the virtual function to which the allocated target location is mapped.

3. The apparatus of claim 2, wherein the processing device is further configured to:
   receive an access request from a requesting virtual function including the indication associated with the requesting virtual function, wherein the requesting virtual function is attempting to access a requested target location, wherein the indication comprises a descriptor of the requesting virtual function and an offset indicative of the requested target location;
   compare the indication associated with the requesting virtual function to the identifier of the requested target location; and
   in an instance in which the descriptor and the offset of the indication matches the descriptor and the offset of the identifier, grant the requesting virtual function access to the requested target location.

4. The apparatus of claim 3, wherein the processing device is further configured to: in an instance in which the descriptor and the offset of the indication matches the descriptor and the offset of the identifier, allow execution of an operation by the requesting virtual function using the requested target location.

5. The apparatus of claim 3, wherein the processing device is further configured to: in an instance in which the descriptor and the offset of the indication does not match the descriptor and the offset of the identifier, deny the requesting virtual function access to the requested target location.

6. The apparatus of claim 1, wherein the virtual function comprises a Peripheral Component Interconnect Express (PCIe) function operated in a Single Root I/O Virtualization (SRIOV) environment of a PCIe device.

7. The apparatus of claim 1, wherein the processing device is associated with a memory allocating framework, and wherein the memory allocating framework comprises a Multiple Entities' Memory Internally Controlled (MEMIC) framework.

8. The apparatus of claim 7, wherein the allocation request includes one or more MEMIC requests associated with the virtual function.

9. A method of allocating physical memory of a device to a virtual function, the method comprising:

receiving an allocation request for allocating a physical memory of a device to a virtual function;

allocating at least one target location of the physical memory in a Base Address Register (BAR) associated with the virtual function based on the allocation request, wherein an identifier for the at least one target location comprises an offset associated with the at least one target location and a corresponding physical location of the physical memory; and providing an indication of the at least one allocated target location for use by the virtual function, wherein the allocated target location is accessible by the virtual function exclusively.

10. The method of claim 9, wherein the identifier comprises a virtual function descriptor corresponding to the virtual function to which the allocated target location is mapped.

11. The method of claim 10, further comprising:

receiving an access request from a requesting virtual function including the indication associated with the requesting virtual function, wherein the requesting virtual function is attempting to access a requested target location, wherein the indication comprises a descriptor of the requesting virtual function and an offset indicative of the requested target location;

comparing the indication associated with the requesting virtual function to the identifier of the requested target location; and in an instance, in which the descriptor and the offset of the indication matches the descriptor and the offset of the identifier, granting the requesting virtual function access to the requested target location.

12. The method of claim 11, further comprising:

in an instance in which the descriptor and the offset of the indication matches the descriptor and the offset of the identifier, allowing execution of an operation by the requesting virtual function using the requested target location.

13. The method of claim 11, further comprising:

in an instance in which the descriptor and the offset of the indication does not match the descriptor and the offset of the identifier, denying the requesting virtual function access to the requested target location.

14. The method of claim 9, wherein the virtual function comprises a Peripheral Component Interconnect Express (PCIe) function operated in a Single Root I/O Virtualization (SRIOV) environment of a PCIe device.

15. An apparatus for allocating physical memory of a device to a virtual function the apparatus comprising: at least one controller and at least one memory including a computer program code, wherein the at least one memory including the computer program code is configured, with the at least one controller, to cause the apparatus to:

receive an allocation request for allocating a physical memory of a device to a virtual function;

allocate at least one target location of the physical memory in a Base Address Register (BAR) associated with the virtual function based on the allocation request, wherein an identifier for the at least one target location comprises an offset associated with the at least one target location and a corresponding physical location of the physical memory; and provide an indication of the at least one allocated target location for use by the virtual function, wherein the allocated target location is accessible by the virtual function exclusively.

16. The apparatus of claim 15, wherein the identifier comprises a virtual function descriptor corresponding to the virtual function to which the allocated target location is mapped.

17. The apparatus of claim 16, wherein the computer program code is configured, with the at least one controller, to further cause the apparatus to:

receive an access request from a requesting virtual function including the indication associated with the requesting virtual function, wherein the requesting virtual function is attempting to access a requested target location, wherein the indication comprises a descriptor of the requesting virtual function and an offset indicative of the requested target location;

compare the indication associated with the requesting virtual function to the identifier of the requested target location; and in an instance, in which the descriptor and the offset of the indication matches the descriptor and the offset of the identifier, grant the requesting virtual function access to the requested target location.

18. The apparatus of claim 17, wherein the computer program code is configured, with the at least one controller, to further cause the apparatus to: in an instance in which the descriptor and the offset of the indication matches the descriptor and the offset of the identifier, allow execution of an operation by the requesting virtual function using the requested target location.

19. The apparatus of claim 17, wherein the computer program code is configured, with the at least one controller, further cause the apparatus to: in an instance in which the descriptor and the offset of the indication does not match the descriptor and the offset of the identifier, deny the requesting virtual function access to the requested target location.

20. The apparatus of claim 1, wherein the virtual function comprises a Peripheral Component Interconnect Express (PCIe) function operated in a Single Root I/O Virtualization (SRIOV) environment of a PCIe device.

* * * * *